United States Patent Office 3,290,417
Patented Dec. 6, 1966

3,290,417
THERMOSETTING COATING COMPOSITIONS MODIFIED WITH AN ALKYLENIMINE
Roger M. Christenson, Gibsonia, Samuel Porter, Jr., Tarentum, and Andrew Halcoussis, Plum Borough, Pa., assignors to Pittsburgh Plate Glass Company, Pittsburgh, Pa., a corporation of Pennsylvania
No Drawing. Filed June 1, 1965, Ser. No. 460,494
17 Claims. (Cl. 260—901)

This application is a continuation-in-part of copending application Serial No. 377,119, filed June 22, 1964.

This invention relates to thermosetting coating compositions containing interpolymers of hydroxyl-containing unsaturated esters, and particularly to such interpolymers and compositions modified to improve their properties by the inclusion of imine-reacted acidic groups.

Interpolymers of hydroxyalkyl esters are used, along with other resinous components, in formulating coating compositions for various articles. One advantageous use is in providing finishes for automobiles and other vehicles. Thermosetting coatings based on such polymers may have many outstanding properties, including excellent gloss retention, solvent resistance, durability, and the like. However, these compositions also have certain disadvantages; for example, it is difficult to obtain uniformly satisfactory pigmented compositions, particularly in black finishes and polychromatic or metallic paints. Intercoat adhesion is also a recurring problem.

It has now been discovered that the overall properties of coatings based on interpolymers of hydroxyalkyl esters are greatly improved by the inclusion of a small proportion of acidic units in the polymeric vehicle and reacting these acidic groups with an alkylenimine or a substituted alkylenimine. Coatings in which such imine-modified acid units are included in the film-forming component have exceptional adhesion to most surfaces, including other primers and paints, and provide pigmented coatings of outstanding quality. For instance, in metallic finishes these vehicles provide uniformity of appearance and orientation of aluminum flake to give maximum gloss. Further, the pigmentation of these products using pigments such as carbon black is carried out with exceptional ease and without the difficulties heretofore encountered. (The process of dispersing pigments in these products is further described in copending application Serial No. 460,497, filed on the same day herewith.) In addition, the overall excellent properties of the corresponding compositions without imine-modified units are retained and in many cases enhanced.

The thermosetting coating compositions of this invention contain as a major film-forming component of the vehicle thereof an interpolymer of from about 2 mole percent to about 25 mole percent of hydroxyalkyl ester of an ethylenically unsaturated carboxylic acid, from about 0.1 mole percent to about 20 mole percent of ethylenically unsaturated carboxylic acid, and at least one other ethylenic monomer. At least about 0.1 percent by weight of imine-modified polymerized acidic carboxyl units, based upon the total weight of interpolymer, are included in the composition.

The imine-modified acidic units are provided by reacting an alkylenimine with vinyl-polymerized ethylenic acid monomer units, which are preferably all or part of the acid monomer interpolymerized along with the hydroxyalkyl ester and the other monomers. However, the imine-modified acidic units can also be included in a polymer blended with the interpolymer, such as a polymer formed of acid and the other monomers desired in the composition, or other carboxyl containing polymer. The acidic units are reacted with an imine, as described below, the reaction being carried out with the acid-containing polymer, or with the acidic groups prior to or during the polymerization.

The acid employed to provide the acidic units can be any polymerizable monocarboxylic or polycarboxylic acid, preferably having from 3 to 6 carbon atoms. An acrylic acid is preferred, this term being utilized to include acrylic acid, methacrylic acid, and similar alpha-substituted acrylic acids. Also quite useful are maleic acid and fumaric acid, as well as the half-esters of such dicarboxylic acids, for example, monobutyl maleate. Other acids, such as crotonic acid, 3-butenoic acid, tiglic acid, and itaconic acid and its half-esters, can also be used, as can various longer chain carboxylic acids containing polymerizable groups. Certain copolymerizable fatty acids, such as dehydrated castor oil acids and the like, may also be employed.

Various alkylenimines, including substituted alkylenimines, can be used to modify the acidic groups. The preferred class of such imines are those of the formula:

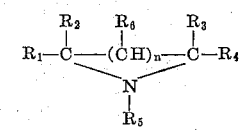

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; alkaryl, such as tolyl, xylyl or the like; or aralkyl, such as benzyl, phenethyl or the like. $R_6$ in the above formula is hydrogen or a lower alkyl radical usually having not more than about 6 carbon atoms, and $n$ is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkylenimines (whether or not within the above formula) does not depend upon the particular nature of any of the substituents, but rather the imine linkage; thus, beneficial results are obtained with interpolymers modified by any of those compounds within the above class.

A number of specific examples of alkylenimines within the class described are as follows:

Ethylenimine (aziridine)
1,2-propylenimine (2-methyl aziridine)
1,3-propylenimine (azetidine)
1,2-dodecylenimine (2-decyl aziridine)
1,1-dimethyl ethylanimine (2,2-dimethyl aziridine)
Phenyl ethylenimine (2-phenyl aziridine)
Tolyl ethylenimine (2-(4-methylphenyl)aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl azetidine)
3-chloropropyl ethylenimine (2-(3-chloropropyl)aziridine p-Chlorophenyl ethylenimine (2-(4-chlorophenyl) aziridine)
Methoxyethyl ethylenimine (2-(2-methoxyethyl)aziridine)
Dodecyl aziridinyl formate (dodecyl 1-aziridinyl carboxylate)
Carbethoxyethyl ethylenimine (2-(2-carboethoxyethyl) aziridine)
N-ethyl ethylenimine (1-ethyl aziridine)
N-butyl ethylenimine (1-butyl aziridine)
N-(2-aminoethyl)ethylenimine (1-(2-aminoethyl) aziridine)
N-(phenethyl)ethylenimine (1-(2-phenylethyl)aziridine)
N-(2-hydroxyethyl)ethylenimine (1-(2-hydroxyethyl) aziridine)
N-(cyanoethyl)ethylenimine (1-cyanoethyl aziridine)
N-phenyl ethylenimine (1-phenyl aziridine)
N-tolyl ethylenimine (1-(2-methylphenyl)aziridine)
N-(p-chlorophenyl)ethylenimine (1-(4-chlorophenyl) aziridine)

Because of their availability and because they have been found to be amoung the most effective, the preferred imines are alkylenimines and substituted alkylenimines having 2 to 4 carbon atoms, and especially ethylenimine, 1,2-propylenimine, and N-hydroxyethyl ethylenimine.

The reaction with the imine takes place upon admixing the imine and the carboxyl-containing material and heating to moderate temperatures, say 50° C. to 150° C., although higher or lower temperatures can be used, depending upon the desired reaction time. The imine reacts with the acidic carboxyl groups, but the exact nature of the reaction which takes place under these circumstances and the structure of the product obtained are not known with certainty. In the case of the preferred ethylenimine and 1,2-propylenimine, the reaction, to some extent at least, involves the production of a primary amino group, which has been hitherto unobtainable in this class of material. Provided that at least some imine-modification is attained, the improved properties are achieved when all or part of the carboxyl groups present are reacted with the imine, the extent of reaction being based upon the amount of imine employed. It is only necessary that at least about 0.1 percent by weight of polymerized carboxylic acid units, based upon the total weight of the interpolymer, be reacted with imine.

The reaction with the imine is preferably carried out during or after the interpolymerization of the hydroxyalkyl ester, the acid and the other monomers. While often the imine reaction is carried out after the acid-containing polymer has been produced, it has been found that some saving of time without any sacrifice in properties is achieved by carrying out the reaction with imine concurrently with the polymerization reaction. In this embodiment, the imine is added to the polymerization mixture at any point prior to the completion of the polymerization reaction. Preferably, the imine is added after the monomers, but before the polymerization is substantially advanced.

The polymerization reaction is otherwise carried out in conventional manner, utilizing heat and/or catalysts and varying solvents and techniques. Generally, a free-radical catalyst, such as cumene hydroperoxide, benzoyl peroxide or similar peroxygen compound, or an azo compound, is employed. When the polymerization reaction and the reaction with imine are conducted concurrently as described above, azo compounds, and especially alpha, alpha'-azobis(isobutyronitrile), are preferred as the catalyst.

The interpolymer can contain as the hydroxyalkyl ester monomer any such ester, but especially preferred are alkylene glycol monoesters in which the alkylene moiety contains up to 12 carbon atoms, and particularly acrylic acid or methacrylic acid monoesters of ethylene glycol, 1,2-propylene glycol, 1,3-propylene glycol, and 1,4-butylene glycol. However, polyhydroxyalkyl esters such as 2,3-dihydroxypropyl acrylate, 6,10-dihydroxydecyl methacrylate and the like, can also be utilized. There may also be employed similar esters of other unsaturated acids, for example, those having up to about 6 carbon atoms, including mono- and diesters of unsaturated dicarboxylic acids, such as maleic acid, fumaric acid and itaconic acid (including in the term "acids" the anhydrides of those acids which form anhydrides). Such esters include, for example, hydroxyethyl hydrogen maleate, bis(hydroxypropyl) fumarate and butyl hydroxyethyl maleate. The use of the esters of unsaturated dicarboxylic acids, in whole or in part, in certain compositions provides specific and desirable characteristics.

The remainder of the interpolymer is made up of one or more other ethylenic monomers. The preferred classes of monomers are the alkyl esters of an ethylenically unsaturated carboxylic acid, such as an alkyl acrylate or an alkyl methacrylate, and vinyl aromatic hydrocarbons. Preferably, at least one alkyl acrylate or methacrylate is present. Those alkyl acrylates and methacrylates generally utilized include the ethyl, methyl, propyl, butyl, hexyl, ethylhexyl, and lauryl acrylates and methacrylates, as well as similar esters having up to about 20 carbon atoms in the alkyl group. The vinyl aromatic hydrocarbon, if one is employed, is usually styrene, an alpha-alkyl styrene, or vinyl toluene. Other monomers can also be employed, for instance, acrylonitrile, vinyl acetate and similar vinyl esters, aliphatic hydrocarbons such as 1,3-butadiene, other esters such as dibutyl maleate, glycidyl methacrylate and dimethylbenzyl acrylate, and other copolymerizable monomers, preferably containing a $CH_2=C<$ group.

The imine-modified interpolymers herein may be themselves utilized as the sole film-forming component of the composition, but it is greatly preferred that they be formulated along with one or more coreactive other resinous components to provide the thermosetting coating composition. The additional film-forming component should be compatible with the hydroxyalkyl ester interpolymer and should be coreactive with the interpolymer at the elevated temperatures such as are employed for curing the coatings, i.e., 150° F. or higher. The preferred additional resinous components are amine-aldehyde resins, and in some instances, alkyd resins.

The amine-aldehyde resins are aldehyde condensation products of melamine, urea, acetoguanamine, or a similar compound. Generally, the aldehyde employed is formaldehyde, although the products can be made from other aldehydes, such as acetaldehyde, crotonaldehyde, acrolein, benzaldehyde, furfural, and others. While resins produced from melamine or urea are most common and are preferred, condensation products of other amines and amides can also be employed, for example, those of triazines, diazines, triazoles, guanidines, guanamines, and alkyl and aryl substituted derivatives of such compounds, including alkyl and aryl substituted ureas and alkyl and aryl substituted melamine, provided at least one amino group is present. Some examples of such compounds are N,N'-dimethylurea, benzyl urea, dicyandiamide, formoguanamine, benzoguanamine, ammeline, 2-chloro-4,6-diamino-1,3,5-triazine, 6-methyl-2,4-diamino-1,3,5-triazine, 2-phenyl-4-amino-6-hydroxy-1,3,5-triazine, 3,5-diaminotriazole, triaminopyrimidine, 2-mercapto-4,6-diamino-pyrimidine, 2,4,6-trihydrazine - 1,3,5 - triazine, 2,4,6-triethyltriamino - 1,3,5 - triazine, 2,4,6 - triphenyltriamino-1,3,5-triazine, and the like.

These aldehyde condensation products contain methylol or similar alkylol groups, all or part of which should be etherified by reaction with an alcohol. Any monohydric alcohol can be employed for this purpose, including methanol, ethanol, propanol, butanol, pentanol, hexanol, and other alkanols, usually having up to about 12 carbon atoms, as well as benzyl alcohol and other aromatic alcohols; cyclic alcohols, such as cyclohexanol; monoethers of glycols, such as the Cellosolves and Carbitols; and haloben-substituted or other substituted alcohols, such as 3-chloropropanol. Amine-aldehyde resins are produced in a manner well known in the art, using acidic or basic catalyst and varying conditions of time and temperature. The formaldehyde is often employed as a solution in water or alcohol, and the condensation, etherification and polymerization reactions may be carried out either sequentially or simultaneously.

Alkyd resins are also employed in compositions containing the imine-modified interpolymer. When an alkyd is utilized, it is usually in conjunction with an amine-aldehyde resin, although in some cases the interpolymer and alkyd can be employed alone. Alkyd resins made from saturated oils or saturated fatty acids are preferred, but also useful are any of the saturated or unsaturated alkyd resins utilized in the coatings field. Thus, for example, the alkyd may be made from such polyfunctional acids as phthalic acid, maleic acid, fumaric acid, isophthalic acid, succinic acid, trimellitic acid, adipic acid, azelaic acid, sebacic acid and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

The alkyd resin may be oil-modified or non-oil-modified. The oil, when one is utilized, is preferably coconut oil or other saturated oil, although drying or semi-drying oils, such as fish oils, linseed oil, soybean oil or the like, can also be employed. If desired, the alkyd resin can contain a monobasic acid, such as benzoic acid, a substituted benzoic acid, or a similar monobasic aromatic acid. The alkyd can also be a polyester containing adipic acid or a similar acid along with various glycols and/or polyols, or it can contain copolymerized monomers such as alkyl esters of acrylic acid and methacrylic acid, acrylonitrile, olefinic hydrocarbons, and other such monomers containing a $CH_2=C<$ group.

The alkyd resin can be produced by any of the well-known methods used to prepare alkyd resins for coatings. It is desirable that some functionality such as unreacted hydroxyl groups, remain in the alkyd. When the alkyd is to be modified with another unsaturated monomer, either an unsaturated fatty acid or an alpha, beta-ethylenically unsaturated acid, such as maleic acid, fumaric acid or crotonic acid, should be present in the alkyd, and the esterification and copolymerization reactions can be carried out simultaneously or at different stages, depending upon the nature of the alkyd employed.

In order to achieve maximum compatibility with the other components of the coating composition, it is often desirable that the alkyd be made using a relatively large excess of the polyol, and that the polyol employed contain the neopentyl structure, as do trimethylolpropane and trimethylolethane.

While amine-aldehyde resins and alkyd resins are preferred, other polymers containing functional groups which provide site for crosslinking with the hydroxyalkyl ester interpolymers are also utilized therewith. These can include, for instance, the following:

(a) Polyepoxides, such as epichlorohydrinbisphenol A reaction products having epoxide equivalents between about 150 and about 1500, e.g., Epon 828, which has an epoxide equivalent of 175–210 and a molecular weight of 350–400, or Epon 1001, which has an epoxide equivalent of 450–525 and a molecular weight of 900–1000;

(b) Epoxy esters, such as esters of unsaturated fatty acids and polyglycidyl ethers of bisphenols, e.g., the linseed oil or soybean oil esters of Epon 828 or a similar polyepoxide;

(c) Vinyl halide polymers, such as polyvinyl chloride-vinyl acetate copolymers, e.g., Vinylite VAGH which contains 91 percent vinyl chloride, 3 percent vinyl acetate and 2.3 percent hydroxyl, or Vinylite VMCH which contains 86 percent vinyl chloride, 13 percent vinyl acetate and 1 percent interpolymerized dibasic acid;

(d) Cellulosic polymers, such as nitrocellulose, ethyl cellulose, cellulose acetate and various cellulose acetate butyrates, a useful cellulose acetate butyrate containing 20.5 percent acetyl content, 26.5 percent butyryl content and 2.5 percent hydroxyl content;

(e) Polysiloxanes, such as dimethyltriphenyltrimethoxytri-siloxane or that known as Dow Corning Z–6018, which is a phenyl substituted siloxane resin having about four hydroxylgroups per molecule and an average molecular of about 1600;

(f) Phenolic resins, such as the alkaline catalyzed condensation product of p-tertiary butyl phenol and excess formaldehyde, and other phenol-formaldehyde resins.

The proportions of each of the resinous components in such compositions is not critical, but generally the compositions have from about 90 percent to about 30 percent of hydroxyalkyl ester interpolymer and about 10 percent to about 70 percent of the coreactive resinous component. The preferred materials contain from about 75 percent to about 40 percent of the hydroxyalkyl ester interpolymer, from about 25 percent to about 60 percent of aminealdehyde resin, and from about 0 to about 35 percent of alkyd. These proportions are based upon the total weight of hydroxyalkyl ester interpolymer and the resin or resins coreactive therewith. It will be noted that all or only part of the hydroxyalkyl ester interpolymer can be modified by reaction with imine; for example, only that part employed for dispersing the pigment.

The interpolymers and blends described above are used as a film-forming component of pigmented or unpigmented coating compositions, and may include in the composition any of the various pigments employed with such materials, as well as solvents, plasticizers, fillers, additives, and the like. They are employed, for example, in pigmented automotive enamels, including pastel and polychromatic enamels, in which colored and metallic pigments and various plasticizers and additives are conventionally included. As indicated above, a particular advantage of these compositions is the ease with which pigments, including carbon black, can be ground or dispersed therein; they also provide especially desirable and attractive coatings with metallic pigments such as are used to produce polychromatic finishes.

The coating compositons are applied by conventional means, preferably by spraying, and are cured in the usual manner, usually by baking at temperatures of 150° F. to 300° F. for 10 to 40 minutes. Such coating compositions can be applied to virtually any solid substrate with advantageous results. For example, these include glass, wood, hardboard, plastics, and various metals such as steel, treated steels, aluminum and the like. Compositions containing the modified interpolymers described herein are particularly useful when applied over primer coatings such as are used in priming automobiles and similar articles. Such primers are generally thermosetting or otherwise curable, i.e., cross-linkable.

There are described below a number of examples which illustrate the invention in several of its embodiments; however, the invention is not to be construed as being limited to the details given. All parts and percentages given in the examples and elsewhere herein are by weight and are based on non-volatile solids content unless otherwise specified.

*Example 1*

The following were added slowly to a glass reaction vessel containing a refluxing mixture of 1096 parts of xylene and 144 parts of butanol:

|  | Parts by weight |
|---|---|
| Butyl methacrylate | 510 |
| Methyl methacrylate | 465 |
| Ethyl acrylate | 345 |
| 2-hydroxypropyl methacrylate | 150 |

| | Parts by weight |
|---|---|
| Methacrylic acid | 30 |
| Benzoyl peroxide | 15 |

After the addition, which took 2½ hours, was complete, the mixture was refluxed for an additional 6 hours, with a solution of 3.75 parts of benzoyl peroxide in 100 parts of xylene being added after each of the second and fourth hours. To this product (3000 parts at 50 percent solids) there were added 5 parts of 1,2-propylenimine, and this mixture was refluxed for 3 hours. The product had an acid value of 6.92 and a Gardner-Holdt viscosity of W—.

This product was pigmented by mixing 188 parts of the imine-modified product, 60 parts of carbon black, 94 parts of butanol, 77 parts of toluene and 1.8 parts of p-phenylenediamine. After grinding this mixture for 72 hours in a steel ball mill, there were added 144 parts of the imine-modified polymer solution and 29 parts of butanol. Grinding was continued for 2½ hours, with the same addition being made after each of the first and second hours.

The dispersion obtained contained 6.4 percent by weight of pigment and 33 percent by weight of vehicle solids. A black enamel was prepared by blending 78 parts of the dispersion with 68.4 parts of the imine-modified product above and 80 parts of butylated melamine-formaldehyde resin (50% solids, made from 5.5 moles of formaldehyde and 6 moles of butanol per mole of melamine). Films of the enamel drawn on steel panels and baked for 30 minutes at 250° F. had highly desirable properties, including excellent jet black appearance. When compared to coatings made in the same manner from interpolymers of the same composition except that no imine was used, the coatings above had greatly superior appearance. For instance, the appearance of the non-imine containing coatings could not meet the standards for commercial automotive applications, whereas the imine-modified coating was satisfactory for such use and met the necessary standards.

*Example 2*

Example 1 was repeated, except that the reaction with the imine was carried out with 3750 parts of polymer solution and 4.7 parts of ethylenimine, giving a product having an acid value of 6.42 and a Gardner-Holdt viscosity of W—. The enamel prepared had essentially equivalent properties to that produced in Example 1.

*Example 3*

A glass reaction vessel was charged with 404 parts of xylene and 175 parts of butanol. This mixture was heated to reflux and the following were added over a period of 3 hours:

| | Parts by weight |
|---|---|
| Styrene | 545 |
| 2-ethylhexyl acrylate | 545 |
| Butyl methacrylate | 182 |
| Methyl methacrylate | 328 |
| Hydroxypropyl methacrylate solution [1] | 182 |
| Hydroxyethyl methacrylate solution [2] | 244 |
| Acrylic acid | 69 |
| Tertiary dodecyl mercaptan | 36.4 |
| Alpha,alpha'-azobis(isobutyronitrile) | 9.1 |
| Xylene | 360 |

[1] 40% solution in xylene containing about 5.5% methacrylic acid.
[2] 30% solution in xylene containing about 2% methacrylic acid.

After the addition, the mixture was cooled to 120° C. and 30.3 parts of ethylenimine were added. Refluxing was again maintained while slowly adding a solution of 5.47 parts of azobis(isobutyronitrile) in 205 parts of xylene. After 3 hours the catalyst addition was completed, and after continuing refluxing for 1 hour, 295 parts of xylene were added and the mixture was cooled. The product had a solids content of 52 percent, an acid value of 5.25, and a Gardner-Holdt viscosity of T+.

A blue pastel enamel was prepared by pigmenting a blend of 60 parts of the above product and 40 parts of melamine-formaldehyde resin (ratio based on solids). The melamine-formaldehyde resin was a butylated condensate of melamine and formaldehyde made with a mole ratio of 5.5 moles of formaldehyde and 6 moles of butanol per mole of melamine. The enamel had a pigment concentration, based on vehicle solids, of 21 percent, and was reduced with xylene to a viscosity (#4 Ford cup) of 17 seconds. The reduced product had a total non-volatile solids content of 43.6 percent.

To the enamel was added 1.5 percent (based on total weight) of a 7.5 percent xylene solution of mono- and dibutyl acid orthophosphate, and a 2.0 mil film was applied to a primed steel panel. The panel was then baked for 30 minutes at 250° F., cooled, and one-half of the coating was wet-sanded. The panel was then recoated with the enamel to which there had been added 1 percent of a 75 percent xylene solution of the above orthophosphate. After baking for 20 minutes at 180° F., the panel was cooled and a cross scribed over the entire panel. A pressure-sensitive adhesive tape was firmly pressed over the scribed area and then pulled away in a plane nearly parallel to the panel. None of the coating was removed, thus indicating that the coating had excellent adhesion throughout.

*Example 4*

Example 3 was repeated, except that a weight ratio of 70 parts of the imine-modified interpolymer and 30 parts of melamine-formaldehyde resin was employed. The panels obtained again exhibited excellent adhesion.

*Example 5*

The procedure of Example 3 was employed in producing an imine-modified interpolymer from the following mixture:

| | Parts by weight |
|---|---|
| Styrene | 728 |
| 2-ethylhexyl acrylate | 545 |
| Methyl methacrylate | 218 |
| Butyl methacrylate | 127 |
| Hydroxypropyl methacrylate solution [1] | 182 |
| Hydroxyethyl methacrylate solution [1] | 242 |
| Methacrylic acid | 54.4 |
| Tertiary dodecyl mercaptan | 27.3 |
| Azobisisobutyronitrile | 9.1 |

[1] As in Example 3.

In place of the ethylenimine employed in Example 3, there was added during the polymerization 17.2 parts of 2-hydroxyethyl ethylenimine. The product obtained had a solids content of 51.3 percent; an acid value of 7.95, and a Gardner-Holdt viscosity of R–S. This product was pigmented with carbon black by milling the following in a steel ball mill for 72 hours:

| | Parts by weight |
|---|---|
| Product above (51.4% solids) | 312 |
| Carbon black | 30 |
| Butanol | 71 |
| Toluene | 36 |
| Xylene | 151 |

The pigment dispersion obtained was employed in a coating composition along with a melamine-formaldehyde resin as in Example 1, and exhibited comparable desirable properties.

*Example 6*

The procedure of Example 1 was followed in preparing an interpolymer from the following mixture:

| | Parts by weight |
|---|---|
| 2-ethylhexyl acrylate | 418 |
| Methyl methacrylate | 674 |
| Butyl methacrylate | 545 |
| Hydroxypropyl methacrylate solution [1] | 182 |
| Hydroxyethyl methacrylate | 73 |
| Methacrylic acid | 34 |

[1] As in Example 3.

| | Parts by weight |
|---|---|
| Azobis(isobutyronitrile) | 9.1 |
| Tertiary dodecyl mercaptan | 34 |

The interpolymer obtained had an acid value of 8.18 and a Gardner-Holdt viscosity of L—. It was reacted with propylenimine, as in Example 1, to provide a modified polymer which when coated on steel panels and baked as above gave both pigmented and unpigmented coatings of excellent properties.

*Example 7*

The pigment dispersion of Example 5 was employed in an enamel along with an acrylic interpolymer, an amine-aldehyde resin and an alkyd resin. The acrylic interpolymer was made using the procedure described in Example 1 from the following:

| | Parts by weight |
|---|---|
| Styrene | 1350 |
| 2-ethylhexyl acrylate | 1350 |
| Methyl methacrylate | 810 |
| Butyl methacrylate | 545 |
| Hydroxypropyl methacrylate solution [1] | 180 |
| Hydroxyethyl methacrylate solution [1] | 180 |
| Methacrylic acid | 70 |

[1] As in Example 3.

The amine-aldehyde resin was a butylated melamine-formaldehyde resin made from 55 moles of formaldehyde and 6 moles of butanol per mole of melamine, and the alkyd was a trimethylolethane-phthalic anhydride resin containing 38.8 percent phthalic anhydride and 35.2 percent coconut fatty acids. The composition of the enamel was as follows:

| | Parts by Weight | | |
|---|---|---|---|
| | Solution | Pigment | Resin Solids |
| Pigment dispersion | 100.0 | 5 | 26 |
| Acrylic interpolymer | 43.0 | | 21.5 |
| Amine-aldehyde resin | 57.0 | | 19.0 |
| Alkyd resin | 29.3 | | 28.5 |

This enamel, when coated on steel panels and baked as above, had excellent jet-black appearance and good gloss (20° gloss was 95).

Other compositions within the class described produce comparable results. For example, the interpolymers of the examples herein can be replaced by corresponding interpolymers modified with other alkylenimines, such as those mentioned. Similarly, the monomers employed in the interpolymers shown are those which have been found to provide overall desirable properties for certain applications, such as automotive finishes, but interpolymers made from other monomer systems can be used and give good products having excellent properties. An example of such and interpolymer is as follows:

*Example 8*

The following were added over a 3 hour period to a reaction vessel containing a refluxing mixture of 675 parts of xylene and 175 parts of butanol:

| | Parts by weight |
|---|---|
| Butyl hydroxyethyl fumarate | 455 |
| Styrene | 545 |
| 2-ethylhexyl acrylate | 382 |
| Methacrylic acid | 40 |
| Methyl methacrylate | 400 |
| Azobis(isobutyronitrile) | 9.1 |
| Tertiary dodecyl mercaptan | 4.5 |
| Xylene | 360 |

After completion of this addition, a solution of 1.82 parts of azobis(isobutyronitrile) in 69 parts of xylene was added over 15 minutes, and refluxing was continued for 6 hours with similar catalyst additions after the second and fourth hours. There were then added 295 parts of xylene. The product had an acid value of 7.3, a solids content of 50.2 percent and a Garnder-Holdt viscosity of V—. The product, when utilized in place of the hydroxyalkyl ester interpolymer of the above examples (e.g. Example 1) products comparable results.

Another embodiment of the invention comprises the addition of a different polymer to the hydroxyalkyl ester interpolymer, this polymer containing the imine-modified vinyl polymerized carboxylic acid groups. Such a polymer can be an acrylic resin, for instance, a methyl methacrylate polymer containing interpolymerized acrylic or methacrylic acid reacted with ethylenimine; an alkyd resin, such as those mentioned above, in which residual carboxyl groups are reacted with ethylenimine or other alkylenimine; or an interpolymer made from any ethylenic monomer system which includes interpolymerized carboxylic acid as described above. Suitable monomers include, for example, styrene, vinyl toluene and other vinyl aromatic hydrocarbons; esters of organic or inorganic acids, such as vinyl acetate, dimethyl maleate, vinyl chloride and the like; as well as the various monomers mentioned above in connection with the hydroxyalkyl ester interpolymer. The only requirement is that the added polymer be reasonably compatible with the other components.

As an example of this embodiment, the composition of Example 1 is made with the same hydroxyalkyl ester interpolymer, but without reaction with ethylenimine. To 60 parts of this interpolymer there are added 10 parts of an interpolymer of 40 percent styrene, 40 percent ethyl acrylate, 15 percent butyl methacrylate and 5 percent methacrylic acid, the acid groups having been reacted with ethylenimine; this mixture is then blended with 40 parts of melamine-formaldehyde resin as in Example 1. This composition when coated on steel panels and cured for 30 minutes at 250° F. provides a coating of useful properties.

Various other coreactive resins can be used in place of or in addition to those exemplified. For example, there can be employed urea-formaldehyde resins, e.g., a butylated urea-formaldehyde condensate made from 2.2 moles of formaldehyde and 1.8 moles of butanol per mole of urea; hexakis(methoxymethyl)melamine; tetrakis(methoxymethyl)benzoguanamine; alkyd resins such as one made from 966 parts of coconut fatty acid, 1006 parts of trimethylolethane, 74 parts of p-t-butyl benzoic acid and 1187 parts of phthalic anhydride. Another alkyd which is useful is made from 793 parts of 1,3-butanediol, 448 parts of trimethylolethane, 834 parts of adipic acid and 573 parts of phthalic anhydride. Such an alkyd can be employed, for instance, in the compositions of Examples 1 or 2 as 20 percent of the total vehicle, or it can replace half of the melamine-formaldehyde resin in the compositions of those examples.

According to the provisions of the patent statutes, there are described above the invention and what are now considered to be its best embodiments. However within the scope of the appended claims, it is to be understood that the invention can be practiced otherwise than as specifically described.

We claim:
1. A thermosetting coating composition containing as a major film-forming component an interpolymer of (a) from about 2 mole percent to about 25 mole percent of hydroxyalkyl ester of an ethylenically unsaturated carboxylic acid, (b) from about 0.1 mole percent to about 20 mole percent of ethylenically unsaturated carboxylic acid, and (c) at least one other copolymerizable ethylenically unsaturated monomer, said composition containing at least about 0.1 percent by weight of vinyl po- lymerized carboxylic acid units which have been reacted with an alkylenimine of the formula:

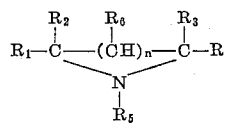

where $R_1$, $R_2$, $R_3$, $R_4$ and $R_5$ are each selected from the group consisting of hydrogen, alkyl, aryl, alkaryl and aralkyl, $R_6$ is selected from the group consisting of hydrogen and lower alkyl, and $n$ is an integer from 0 to 1.

2. The coating composition of claim 1 in which said other monomer is selected from the group consisting of alkyl esters of ethylenically unsaturated carboxylic acids and vinyl aromatic hydrocarbons.

3. The composition of claim 1 in which said vinyl polymerized carboxylic acid units are contained in a polymer which is present in addition to said interpolymer.

4. The coating composition of claim 1 in which said acid units are derived from an ethylenically unsaturated acid of from 3 to 6 carbon atoms and from 1 to 2 carboxyl groups.

5. The coating composition of claim 4 in which said imine is ethylenimine, 1,2-propylenimine or N-hydroxyethyl ethylenimine.

6. The coating composition of claim 1 in which a resin compatible with said interpolymer and coreactive with said interpolymer at elevated temperatures is an additional film-forming component.

7. The coating composition of claim 6 in which said additional film-forming component is an alcohol-modified amine-aldehyde resin.

8. The coating composition of claim 5 in which said amine-aldehyde resin is a butanol-modified melamine-formaldehyde resin.

9. The coating composition of claim 6 in which an alcohol-modified amine-aldehyde resin and an alkyd resin are the additional film-forming components.

10. The coating composition of claim 9 in which said amine-aldehyde resin is melamine-formaldehyde resin and said alkyd resin is a saturated alkyd containing unreacted hydroxyl groups.

11. An interpolymer of (a) from about 2 mole percent to about 25 mole percent of hydroxyalkyl ester of an ethylenically unsaturated carboxylic acid, (b) about 0.1 mole percent to about 20 mole percent of ethylenically unsaturated carboxylic acid, and (c) at least one other ethylenically unsaturated monomer copolymerizable with said ester and said acid, said interpolymer having at least about 0.1 percent by weight of acidic carboxyl groups thereof reacted with an alkylenimine of the formula:

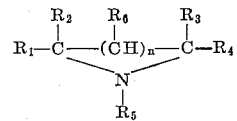

where $R_1$, $R_2$, $R_3$, $R_4$ and $R_5$ are each selected from the group consisting of hydrogen, alkyl, aryl, alkaryl and aralkyl, $R_6$ is selected from the group consisting of hydrogen and lower alkyl, and $n$ is an integer from 0 to 1.

12. The interpolymer of claim 11 in which said unsaturated carboxylic acid has from 3 to 6 carbon atoms and 1 to 2 carboxyl groups.

13. The interpolymer of claim 11 in which said other ethylenically unsaturated monomer is selected from the group consisting of alkyl esters of ethylenically unsaturated carboxylic acids and vinyl aromatic hydrocarbons.

14. The interpolymer of claim 11, which contains (a) from about 2 mole percent to about 25 mole percent of hydroxyalkyl methacrylate having 2 to 3 carbon atoms in the hydroxyalkyl group, (b) from about 0.1 mole percent to about 20 mole percent of an acrylic acid, and (c) at least one other copolymerizable monomer selected from the group consisting of alkyl acrylates, alkyl methacrylates and vinyl aromatic hydrocarbons.

15. The interpolymer of claim 14 in which said alkylenimine is selected from the class consisting of ethylenimine, 1,2-propylenimine, and N-hydroxyethyl ethylenimine.

16. A coated article comprising a solid substrate having thereon an adherent layer of the coating composition of claim 1.

17. A coated article comprising a solid substrate having thereon an adherent layer of a coating composition in which the film-forming component comprises the interpolymer of claim 11.

References Cited by the Examiner
UNITED STATES PATENTS

| | | | |
|---|---|---|---|
| 2,261,294 | 11/1941 | Schlack | 8—116.2 |
| 2,615,845 | 10/1952 | Lippincott et al. | 260—78 |
| 3,079,358 | 2/1963 | Uelzmann | 260—901 |

MURRAY TILLMAN, *Primary Examiner.*

SAMUEL H. BLECH, *Examiner.*

J. WHITE, *Assistant Examiner.*

UNITED STATES PATENT OFFICE
CERTIFICATE OF CORRECTION

Patent No. 3,290,417 December 6, 1966

Roger M. Christenson et al.

It is hereby certified that error appears in the above numbered patent requiring correction and that the said Letters Patent should read as corrected below.

Column 2, line 64, for "ethylanimine" read -- ethylenimine --; column 3, line 21, for "amoung" read -- among --; column 5 line 1, for "ben-substituted" read -- gen-substituted --; line 58, for "site" read -- sites --; column 6, line 9, for "oxytrisiloxane" read -- oxytrisiloxane --; line 24, for "aminealdehyde" read -- amine-aldehyde --; column 10, line 10, for "products" read -- produces --.

Signed and sealed this 23rd day of July 1968.

(SEAL)
Attest:

Edward M. Fletcher, Jr.
Attesting Officer

EDWARD J. BRENNER
Commissioner of Patents